US008365771B2

(12) United States Patent
Xue et al.

(10) Patent No.: US 8,365,771 B2

(45) Date of Patent: Feb. 5, 2013

(54) UNIDIRECTIONAL VALVES AND FILTERING FACE MASKS COMPRISING UNIDIRECTIONAL VALVES

(75) Inventors: Thomas J. Xue, St. Paul, MN (US); Michael K. Domroese, Woodbury, MN (US); Philip G. Martin, Forest Lake, MN (US); Nathan A. Abel, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 542 days.

(21) Appl. No.: 12/639,356

(22) Filed: Dec. 16, 2009

(65) Prior Publication Data

US 2011/0139158 A1 Jun. 16, 2011

(51) Int. Cl.
*F16K 15/16* (2006.01)

(52) U.S. Cl. ............... 137/855; 128/206.12; 128/206.15

(58) Field of Classification Search ............. 128/206.15, 128/206.12; 137/855

See application file for complete search history.

(56) References Cited

U.S. PATENT DOCUMENTS

| | | | | |
|---|---|---|---|---|
| 2,072,516 | A | 3/1937 | Ferenci et al. | |
| 2,230,770 | A | 2/1941 | Almelo | |
| 2,895,472 | A | 7/1959 | Matheson | |
| RE28,102 | E | 8/1974 | Mayhew | |
| D232,635 | S | 9/1974 | Mauri | |
| 4,215,682 | A | 8/1980 | Kubik et al. | |
| 4,419,993 | A | 12/1983 | Petersen | |
| 4,441,494 | A * | 4/1984 | Montalbano | 128/204.17 |
| 4,536,440 | A | 8/1985 | Berg | |
| 4,592,815 | A | 6/1986 | Nakao | |
| 4,630,604 | A | 12/1986 | Montesi | |
| 4,790,306 | A | 12/1988 | Braun et al. | |
| 4,807,619 | A | 2/1989 | Dyrud et al. | |
| 4,827,924 | A | 5/1989 | Japuntich | |

(Continued)

FOREIGN PATENT DOCUMENTS

| | | |
|---|---|---|
| EP | 0756881 | 2/1997 |
| EP | 000875778-0001 | 3/2008 |

(Continued)

OTHER PUBLICATIONS

Wente, Van A., Superfine Thermoplastic Fibers; Industrial and Engineering Chemistry, vol. 48, No. 8, pp. 1342-1346 (Aug. 1956).

(Continued)

*Primary Examiner* — Laura Bouchelle

(74) *Attorney, Agent, or Firm* — Nicole J. Einerson

(57) ABSTRACT

A unidirectional valve for use with a filtering face mask. The valve can include a flap, and a valve seat. The flap can be cantilevered and can flex away from a seal surface of the valve seat to an open position. The valve can further include a housing that at least partially covers the valve seat and the flap. In some embodiments, the height of the housing is no greater than about 1.25 cm, while the distance between the flap and the seal surface when the flap is in the open position is at least 0.35 cm. A projection can be coupled to an inner surface of the housing, and the height of the projection can generally decrease toward the front of the housing. In some embodiments, the projection can have a profile that substantially follows the profile of the flap when the flap is in the open position.

21 Claims, 6 Drawing Sheets

U.S. PATENT DOCUMENTS

| | | | | |
|---|---|---|---|---|
| 4,874,399 | A | | 10/1989 | Reed et al. |
| 4,898,174 | A | | 2/1990 | Fangrow, Jr. |
| 4,915,105 | A | | 4/1990 | Lee |
| 4,934,362 | A | | 6/1990 | Braun |
| 4,971,052 | A | | 11/1990 | Edwards |
| 5,025,052 | A | | 6/1991 | Crater et al. |
| 5,035,239 | A | | 7/1991 | Edwards |
| 5,062,421 | A | | 11/1991 | Burns et al. |
| 5,099,026 | A | | 3/1992 | Crater et al. |
| 5,127,397 | A | | 7/1992 | Kohnke |
| 5,325,892 | A | | 7/1994 | Japuntich et al. |
| 5,394,568 | A | | 3/1995 | Brostrom et al. |
| 5,411,576 | A | | 5/1995 | Jones et al. |
| 5,464,010 | A | | 11/1995 | Byram |
| 5,465,712 | A | | 11/1995 | Malis |
| 5,472,481 | A | | 12/1995 | Jones et al. |
| 5,496,507 | A | | 3/1996 | Angadjivand et al. |
| 5,509,436 | A | | 4/1996 | Japuntich et al. |
| 5,579,761 | A | | 12/1996 | Yuschak et al. |
| 5,617,849 | A | | 4/1997 | Springett et al. |
| 5,687,767 | A | * | 11/1997 | Bowers ......................... 137/855 |
| 5,706,804 | A | | 1/1998 | Baumann et al. |
| 5,908,598 | A | | 6/1999 | Rousseau et al. |
| 5,924,420 | A | | 7/1999 | Reischel et al. |
| 6,041,782 | A | | 3/2000 | Angadjivand et al. |
| 6,047,698 | A | | 4/2000 | Magidson et al. |
| D424,688 | S | | 5/2000 | Bryant et al. |
| 6,055,983 | A | | 5/2000 | Metzger |
| 6,057,256 | A | | 5/2000 | Krueger et al. |
| 6,062,221 | A | | 5/2000 | Brostrom et al. |
| 6,068,799 | A | | 5/2000 | Rousseau et al. |
| 6,123,077 | A | | 9/2000 | Bostock et al. |
| D431,647 | S | | 10/2000 | Henderson et al. |
| 6,125,849 | A | | 10/2000 | Williams et al. |
| 6,158,429 | A | | 12/2000 | Gardner et al. |
| 6,213,122 | B1 | | 4/2001 | Rousseau et al. |
| 6,216,693 | B1 | | 4/2001 | Rekow et al. |
| 6,238,466 | B1 | | 5/2001 | Rousseau et al. |
| D443,927 | S | | 6/2001 | Chen |
| RE37,974 | E | | 2/2003 | Bowers |
| 6,805,124 | B2 | | 10/2004 | Japuntich |
| 7,013,895 | B2 | * | 3/2006 | Martin et al. ............ 128/205.24 |
| 7,028,689 | B2 | | 4/2006 | Martin et al. |
| 7,503,326 | B2 | | 3/2009 | Martin |
| 2002/0023651 | A1 | | 2/2002 | Japuntich et al. |
| 2003/0005934 | A1 | | 1/2003 | Japuntich |
| 2004/0255947 | A1 | | 12/2004 | Martin et al. |
| 2005/0061327 | A1 | | 3/2005 | Martin et al. |
| 2007/0119459 | A1 | | 5/2007 | Japuntich |
| 2007/0144524 | A1 | | 6/2007 | Martin |
| 2008/0178884 | A1 | | 7/2008 | Gerson |
| 2012/0125342 | A1 | | 5/2012 | Gebrewold |

FOREIGN PATENT DOCUMENTS

| | | |
|---|---|---|
| WO | WO 93/24181 | 12/1993 |
| WO | WO 00/01737 | 1/2000 |
| WO | WO 01/28634 | 4/2001 |

OTHER PUBLICATIONS

Naval Research Laboratories, published May 25, 1954, entitled Superfine Organic Fibers by Wente, Van A., Boone, C.D., and Fluharty, E.L., 22 pages.

NIOSH Procedure No. RCT-APR-STP-0004, Revision 1.1, dated Jun. 3, 2005; Determination of Exhalation Valve Leakage Test, Air-Purifying Respirators Standard Testing Procedure, 9 pgs.

3M Occupational Health and Environmental Safety Division Test Method, CPC Valve Vacuum Leak Test; OTM-20189/4, Effective Date Jan. 17, 2006, 3 pages.

International Search Report PCT/US2010/059024 Sep. 1, 2011; 5 pages.

Photographs of 3M™ Cool Flow™ Valve, available at least as early as Dec. 16, 2008, 2 pages.

3M™ Cool Flow™ Valve Product Information, 2001, 4 pages.

* cited by examiner

UNIDIRECTIONAL VALVES AND FILTERING FACE MASKS COMPRISING UNIDIRECTIONAL VALVES

FIELD

The present disclosure generally relates to unidirectional valves, and particularly, exhalation valves, and more particularly, cantilevered exhalation valves, and filtering face masks comprising such valves.

BACKGROUND

Persons who work in polluted environments commonly wear a filtering face mask to protect themselves from inhaling airborne contaminants. Filtering face masks typically have a fibrous or sorbent filter that is capable of removing particulate and/or gaseous contaminants from the air. When wearing a face mask in a contaminated environment, wearers are comforted with the knowledge that their health is being protected, but they are, however, contemporaneously discomforted by the warm, moist, exhaled air that accumulates around their face. The greater this facial discomfort is, the greater the chances are that wearers will remove the mask from their face to alleviate the unpleasant condition.

To reduce the likelihood that a wearer will remove the mask from their face in a contaminated environment, manufacturers of filtering face masks often install an exhalation valve on the mask body to allow the warm, moist, air to be rapidly purged from the mask interior. The rapid removal of the exhaled air makes the mask interior cooler, and, in turn, benefits worker safety because mask wearers are less likely to remove the mask from their face to eliminate the hot moist environment that is located around their nose and mouth.

For many years, commercial respiratory masks have used “button-style” exhalation valves to purge exhaled air from masks interiors. The button-style valves typically have employed a thin circular flexible flap as the dynamic mechanical element that lets exhaled air escape from the mask interior. The flap is centrally mounted to a valve seat through a central post. Examples of button-style valves are shown in U.S. Pat. Nos. 2,072,516, 2,230,770, 2,895,472, and 4,630,604. When a person exhales, a circumferential portion of the flap is lifted from the valve seat to allow air to escape from the mask interior.

Button-style valves have represented an advance in the attempt to improve wearer comfort, but investigators have made other improvements, an example of which is shown in U.S. Pat. No. 4,934,362 to Braun. The valve described in this patent uses a parabolic valve seat and an elongated flexible flap. Like the button-style valve, the Braun valve also has a centrally-mounted flap and has a flap edge portion that lifts from a seal surface during an exhalation to allow the exhaled air to escape from the mask interior.

After the Braun development, another innovation was made in the exhalation valve art by Japuntich et al.—see U.S. Pat. Nos. 5,325,892 and 5,509,436. The Japuntich et al. valve uses a single flexible flap that is mounted off-center in cantilevered fashion to minimize the exhalation pressure that is required to open the valve. When the valve-opening pressure is minimized, less power is required to operate the valve, which means that the wearer does not need to work as hard to expel exhaled air from the mask interior when breathing.

Other valves that have been introduced after the Japuntich et al. valve also have used a non-centrally mounted cantilevered flexible flap—see U.S. Pat. Nos. 5,687,767 and 6,047,698. Valves that have this kind of construction are sometimes referred to as “flapper-style” exhalation valves.

In some flapper-style valves, a projection or fin is positioned on an inner surface of the valve housing to reduce sticking of the flexible flap to an inner surface of the housing during use, for example, as a result of breath condensation.

SUMMARY

Although known valve products have been successful at improving wearer comfort by encouraging exhaled air to leave the mask interior, the valves of the present disclosure include one or more of restructured projections or fins, minimized overall valve height, minimized projected volume of the valve, and/or minimized power-volume-leak rate product, which as described below may provide further benefits towards improving valve performance and wearer comfort.

Some aspects of the present disclosure provide a unidirectional valve for use with a filtering face mask. The unidirectional valve can be positioned to provide fluid communication between a first gas space and a second gas space. The unidirectional valve can include a valve seat comprising a seal surface and an aperture positioned to provide fluid communication between the first gas space and the second gas space, and a flap. The flap can be flexible and can be coupled to the valve seat such that the flap makes contact with the seal surface when the flap is in a closed position and such that the flap can flex away from the seal surface to an open position. The first gas space and the second gas space are not in fluid communication via the aperture when the flap is in the closed position, and the first gas space and the second gas space are in fluid communication via the aperture when the flap is in the open position. The flap can have a fixed end and a free end. The unidirectional valve can further include a housing positioned to at least partially cover the valve seat and the flap. The height of the housing can be no greater than about 1.25 cm. The distance between the flap and the seal surface at the free end of the flap when the flap is in the open position can be at least 0.35 cm.

Some aspects of the present disclosure provide a unidirectional valve for use with a filtering face mask. The unidirectional valve can be positioned to provide fluid communication between a first gas space and a second gas space. The unidirectional valve can include a valve seat comprising a seal surface and an aperture positioned to provide fluid communication between the first gas space and the second gas space, and a flap. The flap can be flexible and can be coupled to the valve seat such that the flap makes contact with the seal surface when the flap is in a closed position and such that the flap can flex away from the seal surface to an open position. The first gas space and the second gas space are not in fluid communication via the aperture when the flap is in the closed position, and the first gas space and the second gas space are in fluid communication via the aperture when the flap is in the open position. The flap can have a fixed end and a free end. The unidirectional valve can further include a housing positioned to at least partially cover the valve seat and the flap. The housing can have a front and a rear, the front of the housing being proximate the free end of the flap and the rear of the housing being proximate the fixed end of the flap. The unidirectional valve can further include a projection coupled to an inner surface of the housing and positioned to project inwardly from the inner surface. The projection can have a height, and the height can generally decrease toward the front of the housing.

Some aspects of the present disclosure provide a unidirectional valve for use with a filtering face mask. The unidirectional valve can be positioned to provide fluid communication between a first gas space and a second gas space. The unidirectional valve can include a valve seat comprising a seal surface and an aperture positioned to provide fluid communication between a first gas space and a second gas space, and a flap. The flap can be flexible and can be coupled to the valve seat such that the flap makes contact with the seal surface when the flap is in a closed position and such that the flap can flex away from the seal surface to an open position. The first gas space and the second gas space are not in fluid communication via the aperture when the flap is in the closed position, and the first gas space and the second gas space are in fluid communication via the aperture when the flap is in the open position. The unidirectional valve can further include a housing positioned to at least partially cover the valve seat and flap, and a projection coupled to an inner surface of the housing and positioned to project inwardly from the inner surface. The projection can have a distal surface, and the distal surface can have a profile that substantially follows the profile of the flap when the flap is in the open position.

Some aspects of the present disclosure provide a unidirectional valve for use with a filtering face mask. The unidirectional valve can be positioned to provide fluid communication between a first gas space and a second gas space. The unidirectional valve can include a valve seat comprising a seal surface and an aperture positioned to provide fluid communication between the first gas space and the second gas space, and a flap. The flap can be flexible and can be coupled to the valve seat such that the flap makes contact with the seal surface when the flap is in a closed position and such that the flap can flex away from the seal surface to an open position. The first gas space and the second gas space are not in fluid communication via the aperture when the flap is in the closed position, and the first gas space and the second gas space are in fluid communication via the aperture when the flap is in the open position. The flap can have a fixed end and a free end. The unidirectional valve can further include a housing positioned to at least partially cover the valve seat and flap. The unidirectional valve can have a volume-power-leak rate product of at least one of no greater than about 150 mW*cc$^2$/sec at a flow rate of no greater than 85 dm$^3$/min, and no greater than about 35 mW*cc$^2$/sec at a flow rate of no greater than 40 dm$^3$/min.

Other features and aspects of the present disclosure will become apparent by consideration of the detailed description and accompanying drawings.

DETAILED DESCRIPTION

Figure 1:
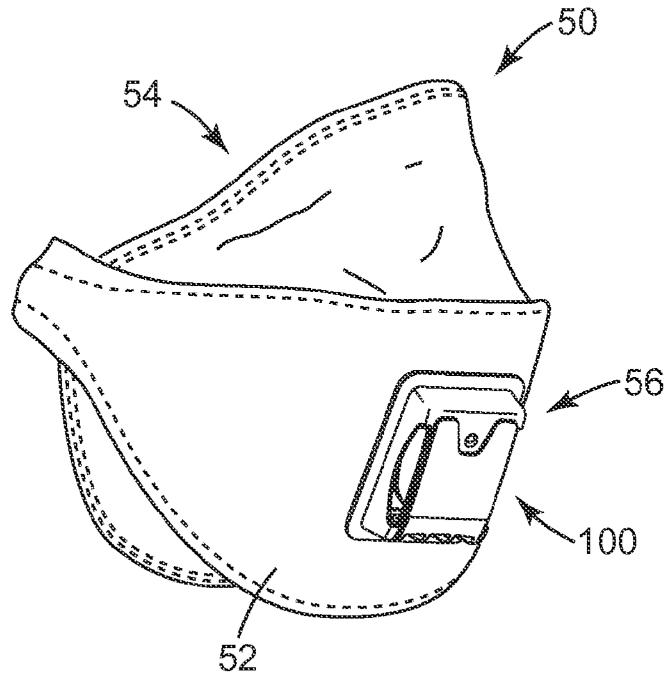
FIG. 1 is a perspective view of a filtering face mask according to one embodiment of the present disclosure, the filtering face mask comprising a unidirectional valve according to one embodiment of the present disclosure.

Before any embodiments of the present disclosure are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. It is to be understood that other embodiments may be utilized, and structural or logical changes may be made without departing from the scope of the present disclosure. Furthermore, terms such as "front," "rear," "top," "bottom," and the like are only used to describe elements as they relate to one another, but are in no way meant to recite specific orientations of the apparatus, to indicate or imply necessary or required orientations of the apparatus, or to specify how the invention described herein will be used, mounted, displayed, or positioned in use.

The present disclosure generally relates to unidirectional valves, and particularly, exhalation valves, and more particularly, cantilevered exhalation valves, and filtering face masks comprising such valves. The present disclosure also generally relates to low-profile unidirectional valves having a reduced overall or maximum height and/or reduced projected volume. The present disclosure also generally relates to unidirectional valves having a reduced volume-power-leak rate product, for example, as compared to other existing valves. The present disclosure also generally relates to cantilevered unidirectional valves comprising a projection or fin coupled to an inner surface of a housing of the valve and a flexible flap having a fixed end and a free end, in which the projection inhibits the flexible flap from sticking to the inner surface of the housing and can have a height that generally decreases toward the front of the valve (e.g., in the direction toward the free end of the flexible flap).

Furthermore, the valves of the present disclosure can protrude less, for example, from a respirator or filtering face mask to which they are coupled, which can reduce the potential obstruction of a user's view over the front of such a respirator or mask. In addition, valves of the present disclosure can include improved incidental particle resistance, for example, by providing less open area to incident particles.

The phrase "air flow" generally refers to a non-zero degree of air movement.

The phrase "ambient air" generally refers to air present in a given environment independent of any air cleaning or air moving apparatus present in that environment.

The phrase "contaminants" generally refers to gases, vapors, and particles (including dusts, mists, and fumes) and/or other substances that generally may not be considered to be gases, vapors, or particles but which may be present in air and may be harmful to a person.

The phrase "exhalation valve" generally refers to a valve that has been designed for use on a respirator to open unidirectionally in response to pressure or force from exhaled air, and can also refer to a valve that opens to allow a fluid to exit a filtering face mask's interior gas space.

The phrase "exhaled air" generally refers to air that is exhaled by a respirator wearer.

The phrase "exhale flow stream" generally refers to the stream of air that passes through an orifice of an exhalation valve during an exhalation.

The phrase "exterior gas space" generally refers to the ambient atmospheric gas space into which exhaled gas enters after passing through and beyond the mask body and/or exhalation valve.

The term "filter" or the phrase "filtration layer" generally refers to one or more layers of material, which layer(s) is adapted for the primary purpose of removing contaminants (such as particles) from an air stream that passes through it.

The phrase "flexible flap" or "flap" adapted to be flexible generally refers to a sheet-like article that is capable of bending or flexing in response to a force exerted from a moving fluid, which moving fluid, in the case of an exhalation valve, would be an exhale flow stream and in the case of an inhalation valve would be an inhale flow stream.

The phrase "fluid inlet" generally refers to an area or portion of the filter element through which fluid can enter.

The phrase "fluid outlet" generally refers to an area or portion of the filter element through which fluid can exit.

The phrase "inhalation valve" means a valve that opens to allow a fluid to enter a filtering face mask's interior gas space.

The phrase "interior gas space" generally refers to the space between a mask body and a person's face.

The term "mask" generally refers to a structure or device having the ability to cover, and the phrase "mask body" generally refers to an air-permeable structure that can fit at least over the nose and mouth of a person and that helps define an interior gas space separated from an exterior gas space.

The phrase "seal surface" generally refers to a surface that makes contact with the flexible flap when the valve is in a closed position.

The term "openness" is generally referred to as a maximum distance between a free end of a flexible flap and a seal surface that can be achieved, for example, when the flap is in its open position.

The phrase "projected height" (also sometimes referred to as an "overall height," "maximum height," "effective height," or "valve profile") can be used to refer to a maximum height of a valve of the present disclosure. For example, if the height of the valve is not uniform over an area, the projected height would be the maximum height over that area.

The phrase "projected area" (also sometimes referred to as an "overall area," "maximum area," or "effective area") can be used to refer to essentially the footprint of a valve of the present disclosure and the maximum area that the valve may take up on a substrate, such as a filtering face mask.

The phrase "projected volume" (also sometimes referred to as an "overall volume," "maximum volume," or "effective volume") can be used to refer to a maximum volume that a valve of the present disclosure takes up in space. For example, the projected volume can be the product of the projected height and the projected area.

FIG. 1 illustrates a filtering face mask 50 comprising a unidirectional valve 100 according to one embodiment of the present disclosure. As shown in FIG. 1, the filtering face mask 50 can include a cup-shaped mask body 52 onto which the unidirectional valve 100 can be coupled. In some embodiments, the filtering face mask 50 can further include a nose clip (not shown) to facilitate fitting the filtering face mask 50 over the nose of a wearer.

The unidirectional valve 100 can be coupled to the mask body 52 using any suitable technique, including, for example, the technique described in U.S. Pat. No. 6,125,849 to Williams et al. or in WO 01/28634 to Curran et al. In embodiments in which the unidirectional valve 100 is coupled to a filtering face mask, such as the filtering face mask 50 in a manner as shown in FIG. 1, the unidirectional valve 100 can be configured to open in response to increased pressure inside the filtering face mask 50. Such increased pressure can occur, for example, when a wearer of the filtering face mask 50 exhales. In such embodiments, the unidirectional valve 100 can be configured to remain closed between breaths and during an inhalation.

The mask body 52 can be adapted to fit over the nose and mouth of a wearer in spaced relation to the wearer's face to create an interior gas space or void 54 between the wearer's face and an inner surface of the mask body 52. In such embodiments, the filtering face mask 50 can define a first interior gas space 54 and a second exterior gas space 56, and the unidirectional valve 100 can be adapted to provide fluid communication between the first interior gas space 54 and the second exterior gas space 56. The mask body 52 can be fluid permeable and can be provided with an opening (not shown) that is located where the unidirectional valve 100 is coupled to the mask body 52 so that exhaled air can exit the interior gas space 54 through the unidirectional valve 100 without having to pass through the mask body 52. In some embodiments, the location of the opening in the mask body 52 can be positioned directly in front of where the wearer's mouth would be when the filtering face mask 50 is being worn. The placement of the opening, and hence the unidirectional valve 100, at this location can facilitate opening of the unidirectional valve 100 with relative ease in response to the exhalation pressure generated by a wearer of the filtering face mask 50. In some embodiments, such as the embodiment illustrated in FIG. 1, essentially the entire exposed surface of the mask body 52 can be fluid permeable, for example, to inhaled air.

The mask body 52 can have a curved, somewhat hemispherical shape as shown in U.S. Pat. No. 4,807,619 to Dyrud et al., or it may take on other shapes as so desired. For example, the mask body 52 can be a cup-shaped mask having a construction like the face mask disclosed in U.S. Pat. No. 4,827,924 to Japuntich. The mask body 50 is shown in FIG. 1 by way of example only of having a three-fold configuration that can fold flat when not in use but can open into a cup-shaped configuration when worn—see also U.S. Pat. No. 6,123,077 to Bostock et al., and U.S. Pat. No. Des. 431,647 to Henderson et al., U.S. Pat. No. Des. 424,688 to Bryant et al. The filtering face mask 50 may also take on many other configurations, such as flat bifold masks disclosed in U.S. Pat. No. Des. 443,927 to Chen. The mask body 52 may also be fluid impermeable and have filter cartridges attached to it like the mask shown in U.S. Pat. No. 5,062,421 to Burns and Reischel. In addition, the mask body 52 also could be adapted for use with a positive pressure air intake as opposed to the negative pressure masks just described. Examples of positive pressure masks are shown in U.S. Pat. No. 5,924,420 to Grannis et al. and U.S. Pat. No. 4,790,306 to Braun et al. The mask body 52 of the filtering face mask 50 may also be connected to a self-contained breathing apparatus, which supplies clean air to the wearer as disclosed, for example, in U.S. Pat. Nos. 5,035,239 and 4,971,052. The mask body 52 may be configured to cover not only the nose and mouth of the wearer (referred to as a "half mask") but may also cover the eyes (referred to as a "full face mask") to provide protection to a wearer's vision as well as to the wearer's respiratory system—see, for example, U.S. Pat. No. 5,924,420 to Reischel et al. The mask body 52 may be spaced from the wearer's face, or it may reside flush or in close proximity to it. In either instance, the filtering face mask 50 can help define the interior gas space 54 into which exhaled air passes before leaving the filtering face mask 50 interior through the unidirectional valve 100. The mask body 52 can also have a thermochromic fit-indicating seal at its periphery to allow the wearer to easily ascertain if a proper fit has been established—see U.S. Pat. No. 5,617,849 to Springett et al.

To hold the filtering face mask 50 snugly upon the wearer's face, the filtering face mask 50 can further include one or more harnesses, straps, tie strings, or any other suitable means for supporting the filtering face mask 50 on a wearer's head or face. Examples of mask harnesses that may be suitable are shown in U.S. Pat. Nos. 5,394,568, and 6,062,221 to Brostrom et al., and U.S. Pat. No. 5,464,010 to Byram.

In some embodiments, the mask body 52 can include a filtration layer that can function as an inhale filter element. When a wearer inhales, air can be drawn through the mask body 52, and airborne particles or other contaminants can become trapped in the interstices between the fibers of the filter layer.

Filtering materials that can be used in the filtering face mask 50 can contain an entangled web of electrically charged microfibers, such as meltblown microfibers (BMF). Microfibers can have an average effective fiber diameter of about 20 micrometers (μm) or less, in some embodiments, are about 1 to about 15 μm, and in some embodiments, can be about 3 to 10 μm in diameter. Effective fiber diameter can be calculated as described in Davies, C. N., The Separation of Airborne Dust and Particles, Institution of Mechanical Engineers, London, Proceedings 1B. 1952. BMF webs can be formed as described in Wente, Van A., Superfine Thermoplastic Fibers in Industrial Engineering Chemistry, vol. 48, pages 1342 et seq. (1956) or in Report No. 4364 of the Naval Research Laboratories, published May 25, 1954, entitled Manufacture of Superfine Organic Fibers by Wente, Van A., Boone, C. D., and Fluharty, E. L. When randomly entangled in a web, BMF webs can have sufficient integrity to be handled as a mat. Electric charge can be imparted to fibrous webs using techniques described in, for example, U.S. Pat. No. 5,496,507 to Angadjivand et al., U.S. Pat. No. 4,215,682 to Kubik et al., and U.S. Pat. No. 4,592,815 to Nakao.

Examples of fibrous materials that may be used as filters in the mask body 52 are disclosed in U.S. Pat. No. 5,706,804 to Baumann et al., U.S. Pat. No. 4,419,993 to Peterson, U.S. Reissue Pat. No. Re 28,102 to Mayhew, U.S. Pat. Nos. 5,472,481 and 5,411,576 to Jones et al., and U.S. Pat. No. 5,908,598 to Rousseau et al. The fibers can include polymers such as polypropylene and/or poly-4-methyl-1-pentene (see U.S. Pat. No. 4,874,399 to Jones et al. and U.S. Pat. No. 6,057,256 to Dyrud et al.) and can also include contain fluorine atoms and/or other additives to enhance filtration performance—see, U.S. patent application Ser. No. 09/109,497, entitled Fluorinated Electret (published as PCT WO 00/01737), and U.S. Pat. Nos. 5,025,052 and 5,099,026 to Crater et al., and may also have low levels of extractable hydrocarbons to improve performance; see, for example, U.S. Pat. No. 6,213,122 to Rousseau et al. Fibrous webs can also be fabricated to have increased oily mist resistance as described in U.S. Pat. No. 4,874,399 to Reed et al., and in U.S. Pat. Nos. 6,238,466 and 6,068,799, both to Rousseau et al.

In some embodiments, the mask body 52 can also include inner and/or outer cover webs that can protect the filter layer from abrasive forces and that can retain any fibers that may come loose from the filter layer. Such a cover web can also include filtering abilities, and can serve to make the filtering face mask 50 more comfortable to wear. The cover webs can be formed of a variety of nonwoven fibrous materials, such as spun bonded fibers that contain, for example, polyolefins, and polyesters (see, for example, U.S. Pat. No. 6,041,782 to Angadjivand et al.), U.S. Pat. No. 4,807,619 to Dyrud et al., and U.S. Pat. No. 4,536,440 to Berg.

Figure 2:
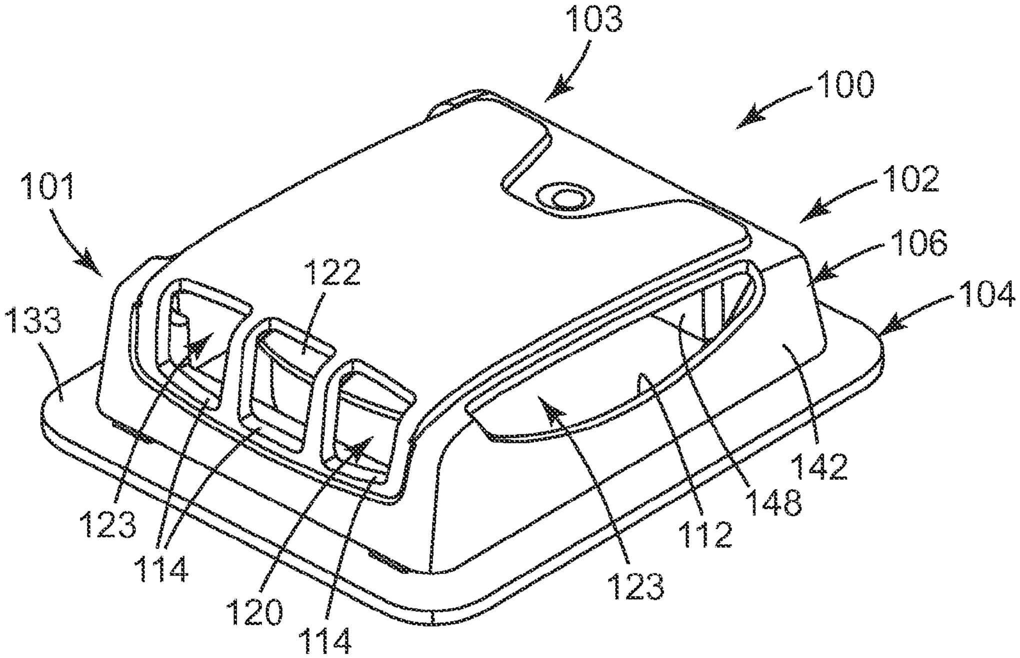
FIG. 2 is a front perspective view of the unidirectional valve of FIG. 1.
Figure 3:
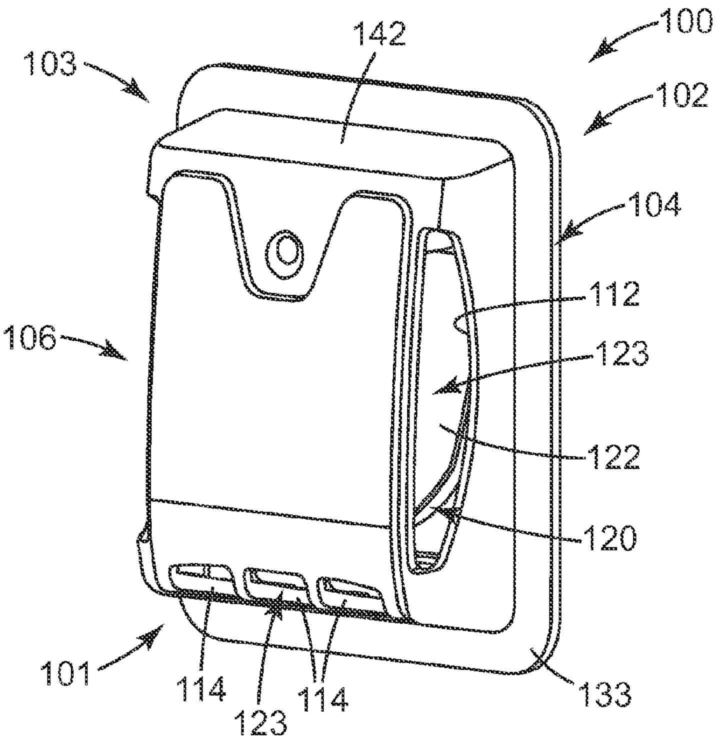
FIG. 3 is a top perspective view of the unidirectional valve of FIGS. 1-2.
Figure 4:
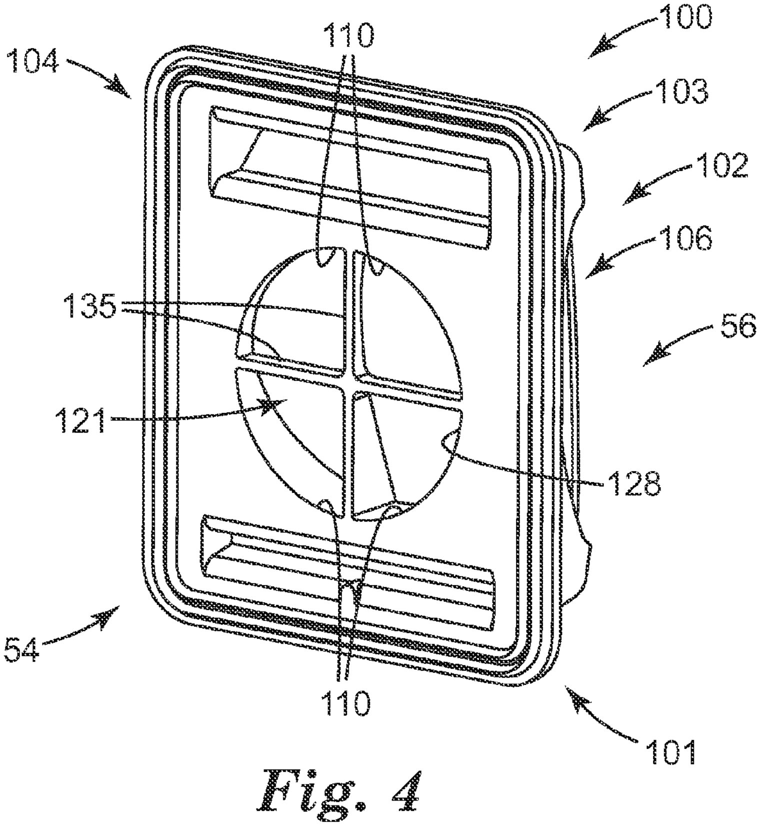
FIG. 4 is a bottom perspective view of the unidirectional valve of FIGS. 1-3.
Figure 5:
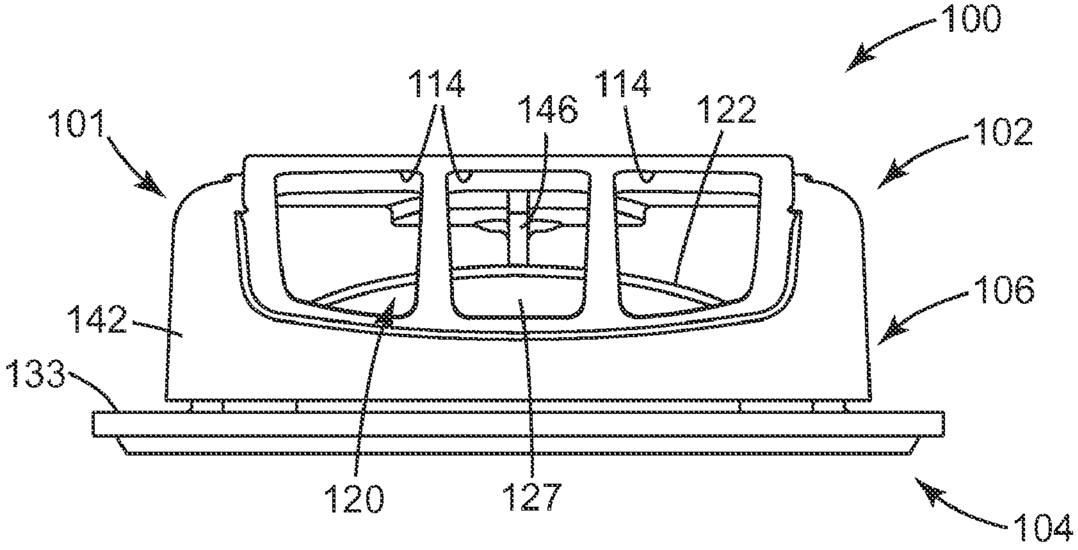
FIG. 5 is a front elevational view of the unidirectional valve of FIGS. 1-4.
Figure 6:
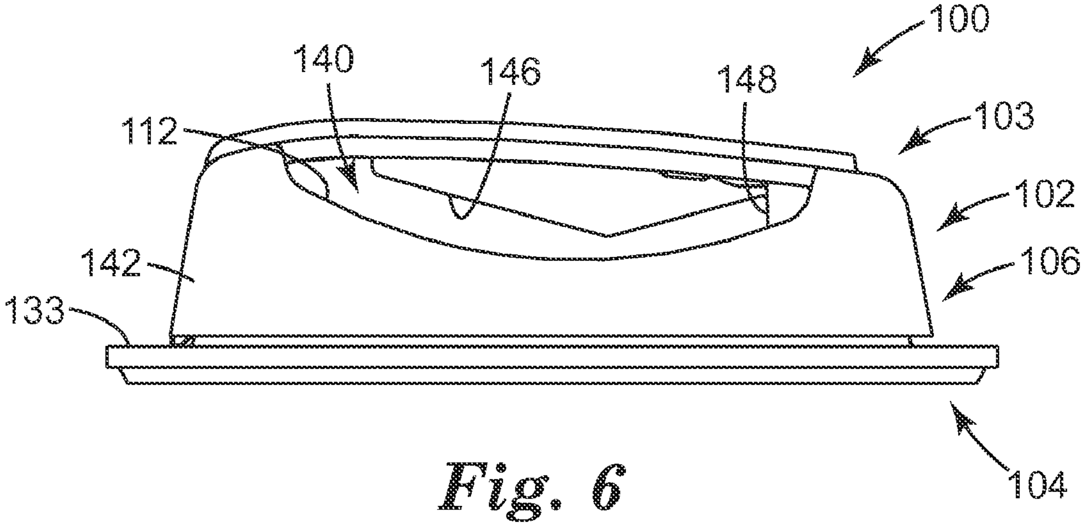
FIG. 6 is a side elevational view of the unidirectional valve of FIGS. 1-5.

FIGS. 2-9 illustrate the unidirectional valve 100 in greater detail. As shown in FIGS. 2-9, the unidirectional valve 100 includes a front 101, a rear 103, a housing 102 (having corresponding front and rear portions), which includes a base 104 and a cover 106 (also sometimes referred to as a "valve cover"), a valve seat 120, a flexible flap 122, a fluid inlet 121 (e.g., defined by four pie-piece-shaped or circular quadrant openings 110 in the base 104, as shown in FIG. 4), and a fluid outlet 123 (e.g., defined by two side openings 112 and three front openings 114 in the cover 106, as shown in FIGS. 2 and 3).

Figure 7:
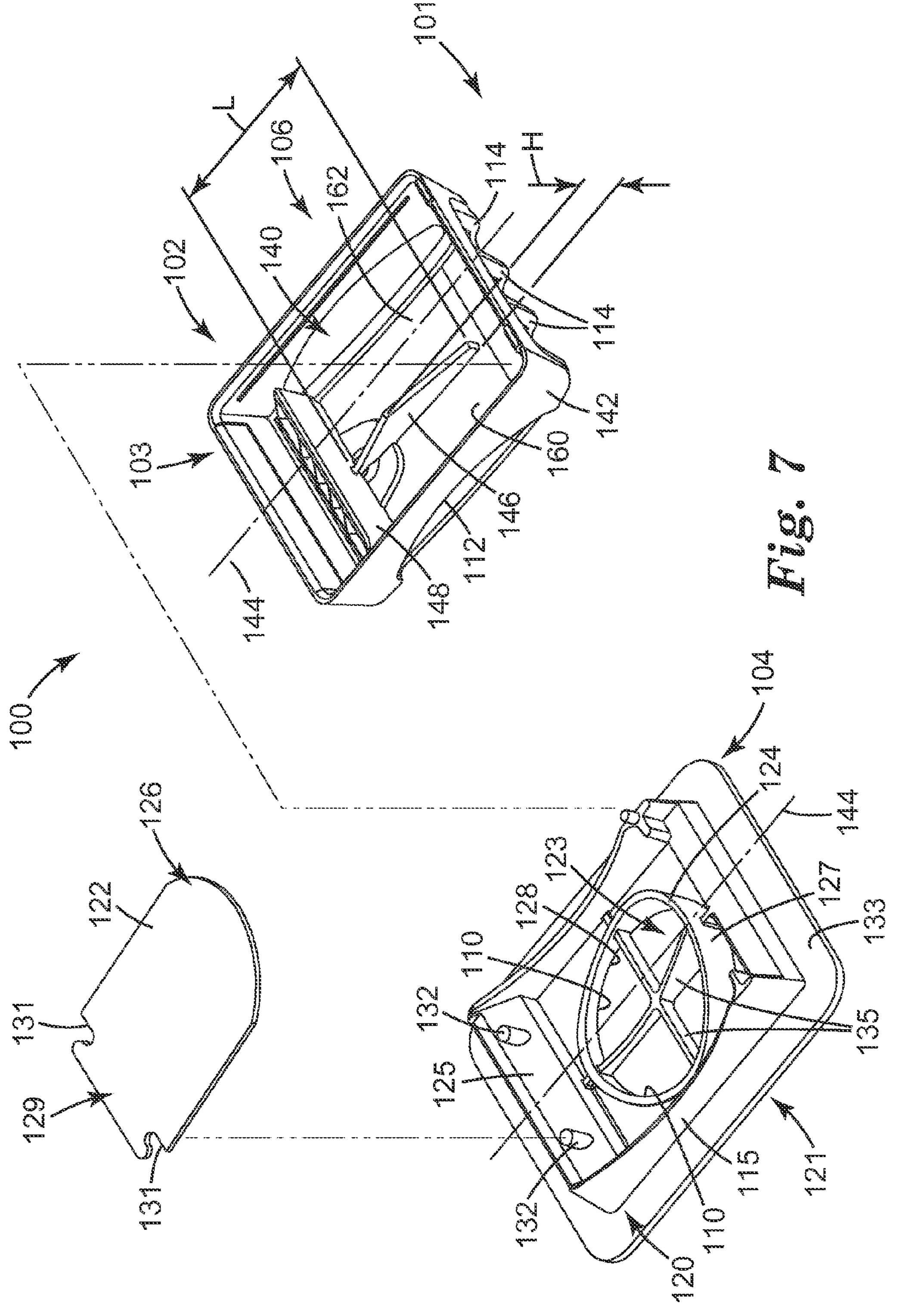
FIG. 7 is an exploded perspective view of the unidirectional valve of FIGS. 1-6.
Figure 8:
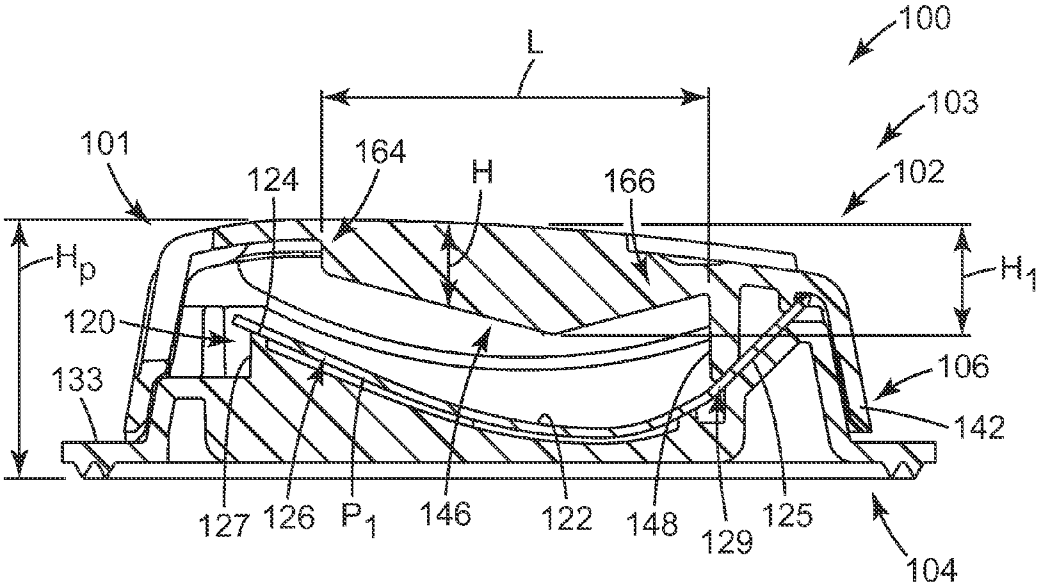
FIG. 8 is a side cross-sectional view of the unidirectional valve of FIGS. 1-7, the unidirectional valve being in a closed state.
Figure 9:
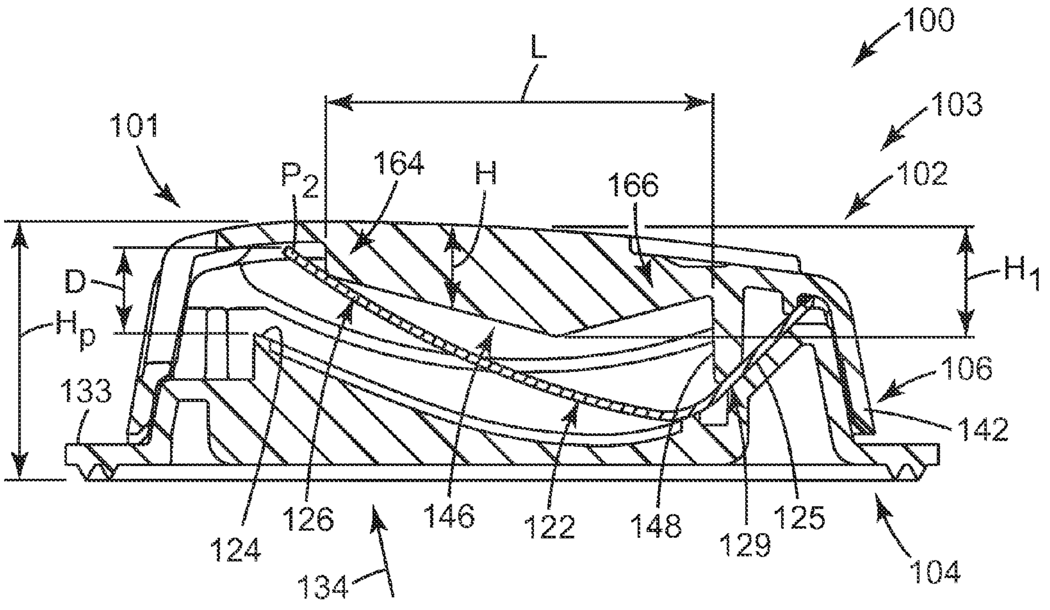
FIG. 9 is a side cross-sectional view of the unidirectional valve of FIGS. 1-8, the unidirectional valve being in an open state.

As shown in FIGS. 7-9, the valve seat 120 can further include an outer wall 115 that can surround a seal surface 124. The flap 122 can rest on and contact the seal surface 124 of the valve seat 120 when the flap 122 is in a first closed position $P_1$ (as shown in FIG. 8), and can also be supported in cantilevered fashion relative to the valve seat 120 at a flap-retaining surface 125 (see FIG. 7). Due to the cantilevered nature of the unidirectional valve 100, the flap 122 can include a front free portion or end 126 and a rear fixed portion or end 129. When a threshold pressure is reached in the interior gas space 54 (e.g., during exhalation), the free end 126 of the flap 122 can lift (e.g., flex away) from the seal surface 124, moving the flap 122 into a second open position $P_2$, as shown in FIG. 9.

Examples of materials from which the flexible flap 122 can be made, can include, but are not limited to, those materials that would promote a good seal between the flap 122 and the valve seat 120. Such materials can include elastomers, both thermoset and thermoplastic; thermoplastic/plastomers; and combinations thereof.

As shown in FIGS. 2-9, the front 101 of the housing 102 generally corresponds to the end of the housing 102 that is proximate the front free end 126 of the flap 122. In addition, the rear 103 of the housing 102 generally corresponds to the end of the housing 102 that is proximate the rear fixed end 129 of the flap 122.

As shown in FIGS. 7-9, the seal surface 124 can be configured to generally curve in a longitudinal dimension (e.g., of the flap 122) in a concave cross-section (e.g., when viewed from a side elevation, as shown in FIGS. 8-9) and may be non-aligned and relatively positioned with respect to a flap-retaining surface 125 to allow the flap 122 to be biased or pressed towards the seal surface 124 under neutral conditions—for example, when a wearer is neither inhaling or exhaling. In some embodiments, as shown in the embodiment illustrated in FIGS. 1-9, the seal surface 124 may reside at the extreme end of a seal ridge 127. The flap can also have a transverse curvature imparted to it as described in U.S. Pat. No. 5,687,767, reissued as U.S. Pat. No. RE37974 to Bowers.

While the curved seal surface 124 is shown in the embodiments illustrated and described in the present disclosure, it should be understood that the seal surface 124 can instead be planar and in alignment with the flap-retaining surface 125. An example of such a planar seal surface is described in greater detail in U.S. Pat. Nos. 7,028,689 and 7,503,326 to Martin et al, each of which is incorporated herein by reference.

When a wearer of the filtering face mask 50 exhales, the exhaled air can pass from the interior gas space 54, through both the mask body 52 and the unidirectional valve 100, and to the exterior gas space 56. Comfort can be best obtained when the highest percentage of the exhaled air passes through the unidirectional valve 100, as opposed to the filter media and/or other layers or materials of the mask body 52. Exhaled air can be expelled from the interior gas space 54 through an aperture 128 in the unidirectional valve 100 by having the exhaled air lift the flexible flap 122 from the seal surface 124. The circumferential or peripheral edge of flap 122 that is associated with the fixed or stationary portion 129 of the flap 122 can remain essentially stationary during an exhalation, while the remaining free circumferential portion 126 of the flap 122 can be lifted from the valve seat 120, and particularly, from the seal surface 124, during an exhalation.

The fixed portion 129 of the flap 122 can be coupled to the valve seat 120 on the flap-retaining surface 125. As shown in FIGS. 7-9, the flap-retaining surface 125 is disposed non-centrally, or laterally, with respect to the aperture 128. The flap 122 can be secured to the surface 125 via a variety of coupling means, including, but not limited to, press-fit or friction-fit engagement, snap-fit engagement, magnets, hook-and-loop fasteners, adhesives, cohesives, mechanical clamps, heat sealing, stitches, staples, screws, nails, rivets, brads, crimps, welding (e.g., sonic (e.g., ultrasonic) welding), any thermal bonding technique (e.g., heat and/or pressure applied to one or both of the components to be coupled), other suitable coupling means, or combinations thereof.

The valve seat 120 can further include one or more pins 132 to facilitate mounting and positioning the flap 122 on the valve seat 120. As shown in FIG. 7, in some embodiments, the flap 122 can include one or more recessed areas or grooves 131 configured to mate with the pins 132. The base 104 of the housing 102 (and/or the valve seat 120 itself) can also include a flange 133 that can extend laterally outwardly from the outer wall 115 of the valve seat 120 at its base to provide a surface that can facilitate coupling the unidirectional valve 100 to another substrate or object, such as the mask body 52.

As discussed above, FIG. 8 shows the flexible flap 122 in the closed position $P_1$ resting on the seal surface 124, and FIG. 9 shows the flexible flap 122 in the open position $P_2$. As shown in FIG. 9, a fluid can pass through the unidirectional valve 100 in the general direction indicated by arrow 134. In some embodiments, the flap 122 can be constructed for use in the unidirectional valve 100 to bend dynamically in response to a force from a moving gaseous flowstream and can readily return to its original position when the force is removed.

In embodiments in which the unidirectional valve 100 is employed as an exhalation valve on a filtering face mask, such as the filtering face mask 50, to purge exhaled air from the mask interior, the arrow 134 representing fluid flow can be used to represent an exhale flow stream. On the other hand, in embodiments in which the unidirectional valve 100 is employed as an inhalation valve, the arrow 134 can be used to represent an inhale flow stream. The fluid that passes through the aperture 128 can exert a force on the flexible flap 122, which can cause the free end 126 of the flap 122 to be lifted from the seal surface 124 (and moved to the open position $P_2$) to cause the unidirectional valve 100 to open. In some embodiments employing the unidirectional valve 100 as an exhalation valve, the unidirectional valve 100 can be oriented on the filtering face mask 50 such that the free end 126 of the flexible flap 122 can be located vertically below the fixed end 129 when the filtering face mask 50 is positioned upright, as shown in FIG. 1. Such an orientation can enable exhaled air to be deflected downwards to prevent moisture from condensing on the wearer's eyewear.

FIG. 7 illustrates the unidirectional valve 100 in an exploded view, with the cover 106 turned upside-down, such that the inside of both the base 104 and the cover 106 is visible. As shown in FIG. 7, the aperture 128 can be disposed radially inwardly from the seal surface 124, and the seal surface 124 can circumscribe or surround the aperture 128 to inhibit the undesired passage of contaminants through the aperture 128.

The aperture 128 and seal surface 124 are shown as being circular in the embodiment illustrated in FIGS. 1-9; however, this need not be the case, and any suitable aperture or seal surface shape can instead be employed. For example, the seal surface 124 and the aperture 128 can be square, rectangular, circular, elliptical, triangular, polygonal, etc., or a combination thereof. In addition, the shape of the seal surface 124 does not need to correspond to the shape of aperture 128, or vise versa. For example, in some embodiments, the aperture 128 can be circular and the seal surface 124 can be rectangular. However, in some embodiments, it can be advantageous for both the seal surface 124 and the aperture 128 to have a circular shape when viewed in the direction of fluid flow.

As further shown in FIGS. 4 and 7, the valve seat 120 can further include cross members or struts 135 that can act to stabilize the seal surface 124 and/or the unidirectional valve 100. The struts 135 also can prevent the flap 122 from inverting into the aperture 128 (e.g., during an inhalation), hence, helping to define a unidirectional valve. As shown in FIGS. 4 and 7, the struts 135 can be positioned to intersect centrally with respect to the aperture 128, but it should be understood that this need not be the case. As mentioned above, and as shown in FIGS. 4 and 7, the embodiment illustrated in FIGS. 2-9 includes two struts 135 that intersect to form four pie-piece-shaped or circular quadrant openings 110 that together at least partially define the fluid inlet 121 of the unidirectional valve 100. In some embodiments, moisture build-up on the struts 135 can hamper the opening of the flap 122. As a result, in some embodiments, the top surfaces of the struts 135 (i.e., the surfaces facing the flap 122 and the cover 106), can be slightly recessed below the seal surface 124 when viewed from a side elevation.

In some embodiments, the base 104 and the valve seat 120 can be formed of a relatively lightweight plastic that can be molded into an integral one-piece body. By way of example only, in some embodiments, the valve seat 120 and/or the base 104 can be made by injection molding techniques. The seal surface 124 that makes contact with the flap 122 can be fashioned to be substantially uniformly smooth to ensure that a good seal occurs and that the flap 122 may reside on the top of the seal ridge 127. The seal surface 124 can include a width great enough to form a seal with the flap 122 but not so wide as to allow adhesive forces caused by condensed moisture to cause the flap 122 to be significantly more difficult to open. In some embodiments, the width of the seal or contact surface 124 can be at least 0.2 mm, and in some embodiments, can range from about 0.25 mm to about 0.5 mm. A more detailed description of the unidirectional valve 100 and the valve seat 120 can be found in U.S. Pat. Nos. 5,509,436 and 5,325,892 to Japuntich et al, each of which is incorporated herein by reference. In addition, information regarding a mask body and a flexible flap formed of multiple layers can be found in U.S. Pat. No. 7,028,689, to Martin et al. Such a multi-layer flap can also be employed in the unidirectional valve 100 of the present disclosure.

In some embodiments, the valve cover 106 may be suitable for use in connection with other bases or other exhalation valves that together with the cover 106 still achieve the low-profile and performance parameters of the present disclosure. As shown in FIG. 7, the valve cover 106 defines an internal chamber 140 into which the flexible flap 122 can move from its closed position $P_1$ to its open position $P_2$. The cover 106 can protect the flap 122 from damage and can assist in directing exhaled air downward away from a wearer's eyeglasses. As shown and as described above, the cover 106 can include a plurality of openings or exhausting holes (e.g., side openings 112 and front openings 114) to allow exhaled air to escape from the internal chamber 140 of the cover 106. Air that exits the internal chamber 140 through the openings 112 and 114 enters the exterior gas space 56 surrounding the unidirectional valve 100, downwardly away from a wearer's eyewear.

By way of example only, the unidirectional valve 100 includes 2 side openings 112 and three front openings 114. While a variety of numbers and arrangements of openings can be used, the illustrated configuration of the three front openings 114 can be advantageous over other numbers or configurations, because the illustrated configuration allows for the center portion of the unidirectional valve 100 to be open, which is generally the highest velocity area of that portion of the valve 100. Such a configuration can reduce the exhausting resistance of the unidirectional valve 100.

As further shown in FIG. 7, the cover 106 can further include an outer wall 142 that is dimensioned to be coupled to and/or at least partially cover at least a portion of the base 104 of the housing 102. For example, as shown in FIG. 7, the outer wall 142 of the cover 106 can be dimensioned to receive at least a portion of the outer wall 115 of the base 104. As such, the base 104 and the cover 106, or at least portions thereof, can be coupled together via any of the above-described coupling means.

As shown in FIG. 7, the cover 106 can further include a longitudinal direction 144, a first longitudinal projection 146 oriented substantially parallel to the longitudinal direction 144, and a second transverse projection 148 oriented substantially perpendicularly with respect to the longitudinal direction 144. Particularly, the first projection 146 and the second projection 148 project downwardly from an upper wall 160 of the cover 106 of the housing 102. Said another way, the first projection 146 and the second projection 148 project downwardly from an inner surface 162 of the housing 102. In some embodiments, the first longitudinal projection 146 and/or the second transverse projection 148 can be coupled to the cover 106 or a portion of the housing 102 and/or integrally formed with the cover 106 or a portion of the housing 102.

The first longitudinal projection 146 is configured to inhibit the flap 122 from sticking to the inner surface 162 (or upper wall 160) of the cover 106 of the housing 102 when the flap 122 is in the open position $P_2$, for example, as a result of surface tension forces from any condensation or moisture present in the unidirectional valve 100. Particularly, the first projection 146 includes a reduced surface area, as compared to the upper wall 160, such that the flap 122 is inhibited from sticking to the first projection 146.

In addition to the first projection 146 being configured to inhibit the sticking of the flap 122, the first projection 146 can be configured such that the height of the valve cover 106 and housing 102, and the projected height of the unidirectional valve 100 can be reduced. As a result, the projected volume of the unidirectional valve 100 can be reduced, for example, if the projected area of the unidirectional valve 100 is not increased.

However, even though the configuration of the first projection 146 allows for a lower overall height and projected volume of the unidirectional valve 100, the first projection 146 still allows the flap 122 to achieve a desired amount of openness or a desired degree of opening, for example, to allow for sufficient valve performance, such as pressure drop, leak rate, and power, as discussed in greater detail below. That is, the present inventors have designed the lower profile unidirectional valve 100 and configured the first projection 146 such that performance is not negatively impacted.

A lower profile and smaller projected volume of the unidirectional valve 100, for example as compared to existing valves, can provide a sleeker, less bulky, more comfortable, and more aesthetically pleasing unidirectional valve 100 and/or filtering face mask 50.

As shown in FIG. 7, the first projection 146 can include a length L in the longitudinal direction 144 of the unidirectional valve 100, with a front 164 proximate the front 101 of the unidirectional valve 100 and front free portion 126 of the flap 122, and a rear 166 proximate the rear 103 of the unidirectional valve 100 and fixed rear portion 129 of the flap 122. By way of example only, the length L is shown as being measured from a point at the front 164 of the first projection 146 to a point located just in front of the second projection 148; however, it should be understood that the length L can instead be measured as the distance from the front 164 of the first projection 146 to a point behind the second projection 148. The rear 166 of the first projection 146 can be defined according to the given length definition. Generally, the "length" L of the first projection 146 refers to the dimension that extends substantially parallel to or along the longitudinal direction 144 of the unidirectional valve 100.

As further shown, the first projection 146 can have a height H that generally decreases toward the front 101 of the unidirectional valve 100 and the front 164 of the first projection 146. In addition, as shown in FIG. 9, the first projection 146 can include a profile that substantially follows the profile of the flap 122 when the flap 122 is in its open position $P_2$.

In addition, in some embodiments, the height H at the front 164 of the first projection 146 is at least about 0.5 mm, and in some embodiments, at least about 1.0 mm. In some embodiments, the height H at the front 164 of the first projection 146 is no greater than about 2.5 mm, in some embodiments, no greater than about 2.0 mm, and in some embodiments, no greater than about 1.5 mm.

In some embodiments, the maximum or overall height $H_1$ of the first projection 146 is at least about 2.5 mm, and in some embodiments, at least about 3.0 mm. In some embodiments, the maximum or overall height $H_1$ of the first projection 146 is no greater than about 5.0 mm, in some embodiments, no greater than about 4.5 mm, in some embodiments, no greater than about 4.0 mm, and in some embodiments, no greater than about 3.5 mm.

As a result, in some embodiments, the ratio of the height H at the front 164 of the first projection 146 to the maximum or overall or greatest height $H_1$ of the first projection 146 can be at least about 0.15, in some embodiments, at least about 0.30, and in some embodiments, at least about 0.35. In some embodiments, the ratio of the height H at the front 164 of the first projection 146 to the maximum or overall or greatest height $H_1$ of the first projection 146 can be no greater than about 0.7, in some embodiments, no greater than about 0.5, and in some embodiments, no greater than about 0.4. In some embodiments, the ratio of the height H at the front 164 of the first projection 146 to the maximum or overall or greatest height $H_1$ of the first projection 146 ranges from about 0.33 to about 0.63.

In some embodiments, the first projection 146 can be configured so as not to hinder the opening of the flap 122. For example, in some embodiments, the free portion 126 of the flap 122 can achieve an "openness" or a maximum distance D spaced from the seal surface 124 of at least about 0.3 cm when the flap 122 is in its open position $P_2$. In some embodiments, the flap 122 can open to a distance D of at least about 0.35 cm from the seal surface 124, and in some embodiments, the flap 122 can open to a distance of at least about 0.4 cm from the seal surface 124. In some embodiments, the flap 122 can open to a distance D of no greater than about 0.55 cm, in some embodiments, no greater than about 0.50 cm, and in some embodiments, no greater than about 0.45 cm. In some embodiments, the flap 122 can open to a distance D of about 0.35 cm.

Figure 10:
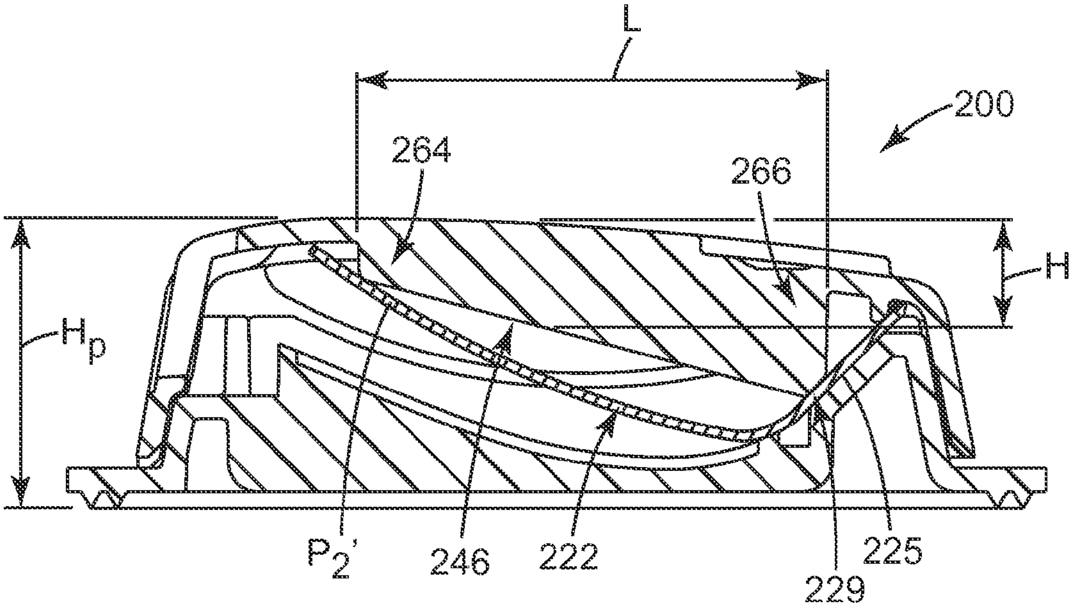
FIG. 10 is a side cross-sectional view of a unidirectional valve according to another embodiment of the present disclosure, the unidirectional valve being in an open state.
Figure 11:
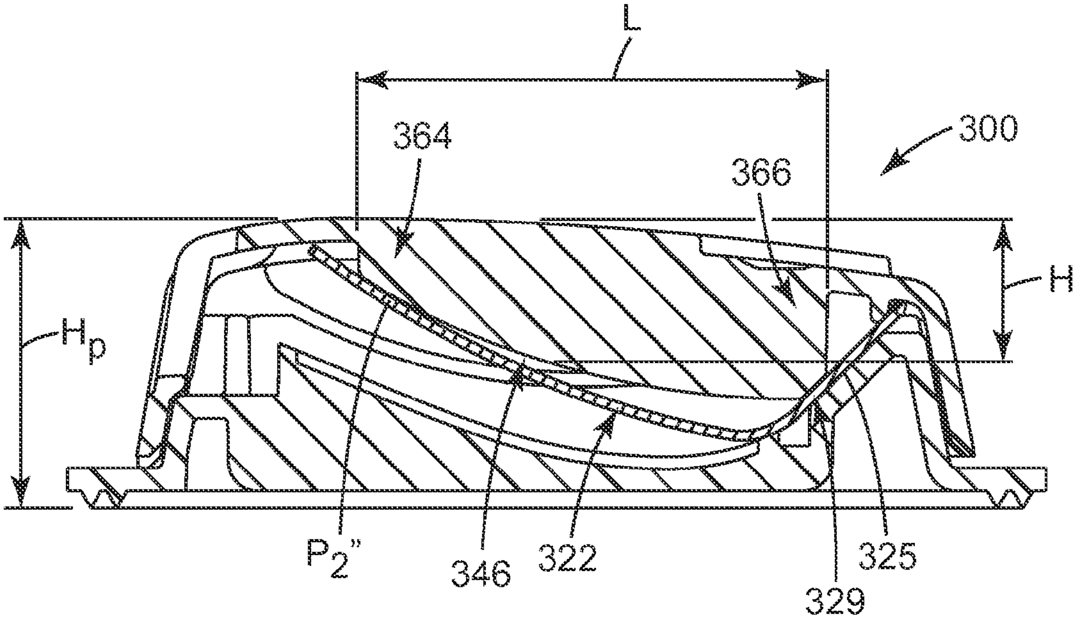
FIG. 11 is a side cross-sectional view of a unidirectional valve according to another embodiment of the present disclosure, the unidirectional valve being in an open state.

As clearly shown in FIG. 8, the maximum height of the first projection 146 of the embodiment illustrated in FIGS. 1-9 occurs at a point along the length L of the first projection 146 that is not at the front 164 or the rear 166 of the first projection 146, but rather at a point intermediate of the front 164 and the rear 166. In such embodiments, the first projection 146 can include a first portion that increases in height from the front 164 to the maximum height $H_1$ and a second portion that decreases in height from the maximum projected height $H_1$ to the rear 166 of the first projection 146. However, it should be understood that other suitable configurations of the first projection 146 are possible. Two additional exemplary first projection configurations are shown in FIGS. 10 and 11 and described below.

As clearly shown in FIGS. 8 and 9, the second transverse projection 148 can be configured to press and/or hold the rear (i.e., fixed) portion 129 of the flap 122 into place, for example, on the flap-retaining surface 125. As such, the second transverse projection 148 can also contribute to defining the fixed portion 129 of the flap 122. In such embodiments, the second transverse projection 148 can provide a biasing force on the flap 122 to contribute to biasing the flap 122 against the seal surface 124, for example, to inhibit the flap 122 from falling away from the seal surface 124 when undesired (e.g., during inhalations, between breaths, and/or when the unidirectional valve 100 is inverted or in a non-upright orientation). Other aspects of the cantilevered, biased flap 122 are described, for example, in U.S. Pat. No. 5,325,892 to Japuntich.

In some embodiments, the first projection 146 and the second projection 148 can be coupled together, separately coupled to another portion of the cover 106, and/or integrally formed together (e.g., by molding).

As described above, the configuration of the first projection 146 can contribute to reducing the overall height and projected volume of the unidirectional valve 100, without deteriorating the performance of the valve 100. For example, in some embodiments, the unidirectional valve 100 can have a projected height $H_p$ of about 3.5 mm less than other existing valves. Furthermore, in some embodiments, the projected height $H_p$ of the unidirectional valve 100 can be at least about 1.0 cm, and in some embodiments, at least about 1.5 cm. In some embodiments, the projected height $H_p$ of the unidirectional valve 100 can be no greater than about 2 cm, in some embodiments, no greater than about 1.6 cm, in some embodiments, no greater than about 1.5, and in some embodiments, no greater than about 1.1 cm. In some embodiments, the projected height can be about 1.25 cm.

In some embodiments, the ratio of the height H at the front 164 of the first projection 146 to the projected height $H_p$ of the unidirectional valve 100 can be at least about 0.08, and in some embodiments, at least about 0.10. In some embodiments, the ratio of the height at the front 164 of the first projection 146 to the to the projected height $H_p$ of the unidirectional valve 100 can be no greater than about 0.15, and in some embodiments, no greater than about 0.12.

In some embodiments, the projected or effective area (e.g., the area the base 104, including the flange 133, would take up on a substrate, such as the filtering face mask 50) of the unidirectional valve 100 can be at least about 6.5 $cm^2$, and in some embodiments, at least about 9.5 $cm^2$. In some embodiments, the projected area can be no greater than about 16.0 $cm^2$, in some embodiments, no greater than about 12.0 $cm^2$, and in some embodiments, no greater than about 9.0 $cm^2$. In some embodiments, the projected area can be about 15.4 $cm^2$.

Furthermore, in some embodiments, the projected volume of the unidirectional valve 100 can be at least about 7.0 $cm^3$, in some embodiments, at least about 7.2 $cm^3$, and in some embodiments, at least about 15.0 $cm^3$. In some embodiments, the projected volume can be no greater than about 25 $cm^3$, in some embodiments, no greater than about 24.7 $cm^3$, and in some embodiments, no greater than about 20.0 $cm^3$. In some embodiments, the projected volume can be about 19.1 $cm^3$. Because the flange 133 of the unidirectional valve 100 of the illustrated embodiment is included in the calculation of the projected area, and this projected area is used to calculate the projected volume, the projected volume is an overstatement of the actual volume of the unidirectional valve 100. As a result, it should be understood that the actual volume of the unidirectional valve 100 can be less than the projected volume.

In addition, as mentioned above, in some embodiments, the unidirectional valve 100 can include improved incidental particle resistance over existing valves, for example, by providing less open area to incident particles. For example, in some embodiments, at an incident particle direction of 45 degrees, a valve of the present disclosure can include an exposed valve seat area of no greater than about 15 $mm^2$, in some embodiments, no greater than about 12 $mm^2$, and in some embodiments, no greater than about 10 $mm^2$. In some embodiments, the unidirectional valve 100 can include an exposed valve seat area of about 9.4 $mm^2$.

In addition, the first longitudinal projection 146 is shown and described as having a length in the longitudinal direction 144 of the unidirectional valve 100. However, it should be understood that other configurations of the projection 146 that inhibit the flap 122 from sticking to an inner surface of the housing 102, that facilitate a low-profile valve housing 102, that allows for adequate flap opening, and/or that provides a desired power-leak rate-volume product can be employed without departing from the spirit and scope of the present disclosure. For example, in some embodiments, the projection 146 can include a series of pins that project downwardly from the cover 106. By way of example only, in some embodiments, the projection 146 can include a single projection or pin that does not have a substantial length. Other suitable configurations are also possible.

By way of example only, both the first projection 146 and the second projection 148 include at least a portion that is oriented substantially vertically with respect to the upper wall 160 of the cover 106 (e.g., in the orientation shown in FIGS. 8 and 9), such that at least a portion of the first and second projections 146 and 148 project substantially straight down from the upper wall 160. However, it should be understood that this need not be the case, and one or both of the projections 146 and 148 can instead include a different suitable orientation.

In addition, the first projection 146 is shown and described as being oriented substantially along the longitudinal direction 144 of the unidirectional valve 100, and the second projection 148 is shown and described as being transverse or substantially perpendicular to the longitudinal direction 144 of the unidirectional valve 100. However, it should be understood that these orientations are shown and described by way of example only and other suitable configurations may be possible.

In addition, while the unidirectional valve 100 is generally described as being employed as an exhalation valve, it should be understood that the unidirectional valve 100 can also be suitable for use as inhalation valve. Like an exhalation valve, an inhalation valve is also a unidirectional fluid valve that provides for fluid transfer between a first gas space and a second gas space. Unlike an exhalation valve, however, an inhalation valve allows air to enter the interior of a mask body. An inhalation valve thus allows air to move from the exterior gas space 56 to the interior gas space 54 during an inhalation.

Such inhalation valves can be used in conjunction with filtering face masks that have filter cartridges attached to them. In some embodiments, the unidirectional valve 100 may be second to either a filter cartridge and/or to a mask body. In any case, the inhalation valve can be disposed in an inhale flow stream downstream to where the air has been filtered or otherwise has been made safe to breathe (e.g., filtered of contaminants). Examples of commercially available masks that include inhalation valves include the 5000™ and 6000™ Series respirators available from 3M Company, St. Paul, Minn. Patented examples of filtering face masks that include an inhalation valve are disclosed in U.S. Pat. No. 5,062,421 to Burns and Reischel, U.S. Pat. No. 6,216,693 to Rekow et al., and in U.S. Pat. No. 5,924,420 to Reischel et al. (see also U.S. Pat. Nos. 6,158,429, 6,055,983, and 5,579,761). To use the unidirectional valve 100 shown in FIGS. 1-9 as an inhalation valve, it merely needs to be mounted to the mask body 52 in an inverted fashion so that the flap 122 lifts from the seal surface 124 during an inhalation rather than during an exhalation. In some embodiments, the flap 122 can be pressed against the seal surface 124 during an exhalation rather than an inhalation.

Valves of the present disclosure may be capable of exceeding the performance of other valves in terms of a volume-power-leak rate product under various flow rates. These parameters may be measured using the Leak Rate Test, Pressure Drop Test, Integrated Valve Actuation Power (IVAP) calculation, and Volume-Power-Leak Rate product calculation described below. The IVAP is a measure of the power required to open the valve. The higher the IVAP value, the more difficult it is to open the valve. As described in greater detail below, the power can be calculated as the integration (e.g., the area under the curve) of a Pressure Drop vs. Flow Rate curve over various flow rates. After the projected volume, leak rate, and power have been determined for a given valve, the volume-power-leak rate product can be calculated for a given valve, as described in the Examples section below.

In some embodiments, the Integrated Valve Actuation Power (IVAP) of valves of the present disclosure at a flow rate of 85 L/min (85 $dm^3$/min; 1417 $cm^3$/sec) can be no greater than about 100 mW (0.100 W; 640 Kg-force*m/sec), in some embodiments, no greater than about 80 mW, and in some embodiments, no greater than about 60 mW. In some embodiments, the IVAP at a flow rate of 85 L/min can be about 78 mW.

In some embodiments, the Integrated Valve Actuation Power (IVAP) of valves of the present disclosure at a flow rate of 40 L/min (40 $dm^3$/min; 667 $cm^3$/sec) can be no greater than about 25 mW (0.100 W; 640 Kg-force*m/sec), in some embodiments, no greater than about 20 mW, and in some embodiments, no greater than about 15 mW. In some embodiments, the IVAP at a flow rate of 40 L/min can be about 16 mW.

In some embodiments, the Volume-Power-Leak Rate product of valves of the present disclosure at a flow rate of 85 L/min (85 $dm^3$/min; 1417 $cm^3$/sec) can be no greater than about 200 mW*$cm^6$/sec (0.20 W*$cm^6$/sec; 0.20 W*$cc^2$/sec; $8\times10^4$ mm H2O*$cc^2$*L/$min^2$), in some embodiments, no greater than about 150 mW*$cm^6$/sec, in some embodiments, no greater than about 130 mW*$cm^6$/sec, and in some embodiments, no greater than about 120 mW*$cm^6$/sec.

In some embodiments, the Volume-Power-Leak Rate product of valves of the present disclosure at a flow rate of 40 L/min (40 $dm^3$/min; 667 $cm^3$/sec) can be no greater than about 40 mW*$cm^6$/sec (0.04 W*$cm^6$/sec; 0.04 W*$cc^2$/sec; $1.6\times10^4$ mm H2O*$cc^2$*L/$min^2$), in some embodiments, no greater than about 35 mW*$cm^6$/sec, in some embodiments, no greater than about 30 mW*$cm^6$/sec, and in some embodiments, no greater than about 20 mW*$cm^6$/sec.

The Leak Rate is a parameter that measures the ability of a valve to remain closed under neutral conditions. The Leak Rate test is described below in detail but generally measures the amount of air that can pass through the valve at an air pressure differential of 1 inch water (249 Pa). Leak rates can range from 0 to 30 cubic centimeters per minute (cc/min) at 249 Pa pressure, with lower numbers indicating better sealing. Using a filtering face mask of the present invention, leak rates that are less than or equal to 30 $cm^3$/min can be achieved in accordance with the present invention.

In some embodiments, leak rates of no greater than about 10 cc/min (0.167 cc/sec) can be achieved, in some embodiments, no greater than about 6 cc/min (0.100 cc/sec), and in some embodiments, no greater than about 5 cc/min (0.083 cc/sec). In some embodiments, a leak rate of about 5.4 cc/min (0.090 cc/sec) can be achieved. Exhalation valves that have been fashioned in accordance with the present disclosure may demonstrate a leak rate in the range of about 1 cc/min (0.017 cc/sec) to about 10 cc/min (0.167 cc/sec).

The valve opening pressure drop measures the resistance to the initial lifting of the flap from the valve's seal surface. This parameter may be determined as described below in the Pressure Drop Test. In some embodiments, the valve opening pressure drop at 10 L/min can be less than 30 Pa, in some embodiments, less than 25 Pa, and in some embodiments, less than 20 Pa when testing a valve in accordance with the Pressure Drop Test described below. In some embodiments, the valve opening pressure drop can be about 5 to about 30 Pa at 10 L/min when testing a valve in accordance with the Pressure Drop Test described below.

FIG. 10 illustrates a unidirectional valve 200 according to another embodiment of the present disclosure. The unidirectional valve 200 is similar to the unidirectional valve 100, except that the unidirectional valve 200 includes a first projection 246 having a different configuration. As such, elements and features corresponding to elements and features in the illustrated embodiment of FIGS. 1-9 are provided with the same reference numerals in the 200 series. Reference is made to the description above accompanying FIGS. 1-9 for a more complete description of the features and elements (and alternatives to such features and elements) of the embodiment illustrated in FIG. 10.

The first projection 246 includes a height H that generally decreases toward its front 264. In addition, the first projection 246 includes many of the properties and functions as those described above with respect to the first projection 146 of the unidirectional valve 100; however, the first projection 246 of the unidirectional valve 200 has a maximum height that occurs at the rear 266 of the first projection 246. As a result, the first projection 246 increases (e.g., linearly) in height H from its front 264 to its rear 266 along its length L, and the maximum height occurs at its rear 266.

Although not explicitly shown in the cross-sectional view shown in FIG. 10, it should be understood that, in some embodiments, the unidirectional valve 200 can include a second transverse projection, similar to the second projection 148 of the unidirectional valve 100, to press and/or hold a rear (i.e., fixed) portion 229 of the flap 222 into place, for example, on a flap-retaining surface 225. In such embodiments, the rear 266 of the first projection 246 can include or be coupled to (or provided by) the second transverse projection.

As shown in FIG. 10, when a flap 222 of the unidirectional valve 200 is in its open position $P_2'$, the profile of the first projection 246 is still configured to substantially follow the profile of the flap 222 when it is in its open position $P_2'$. By way of example only, the profile of the first projection 246 is substantially flat, such that the cross-sectional shape of the first projection 246, as shown in FIG. 10, is substantially triangular (e.g., has a shape of a right triangle). By contrast, the first projection 146 of the unidirectional valve 100 of FIGS. 1-9 can be described as having a non-right triangular cross-sectional shape, as shown in FIGS. 8-9.

The rest of the properties described above with respect to the first projection 146, such as the height H at the front 264 of the first projection 246; ratio of the height H at the front 264 of the first projection 246 to the maximum height of the first projection 246; ratio of the height H t the front 264 of the first projection 246 to a projected height $H_p$ of the unidirectional valve 200; the first projection 246 generally decreasing in height H toward the front 264 of the first projection 246, etc. are generally the same as those described above with respect to the first projection 146 of the unidirectional valve 100 of FIGS. 1-9.

FIG. 11 illustrates a unidirectional valve 300 according to another embodiment of the present disclosure. The unidirectional valve 300 is similar to the unidirectional valve 100, except that the unidirectional valve 300 includes a first projection 346 having a different configuration. As such, elements and features corresponding to elements and features in the illustrated embodiment of FIGS. 1-9 are provided with the same reference numerals in the 300 series. Reference is made to the description above accompanying FIGS. 1-9 for a more complete description of the features and elements (and alternatives to such features and elements) of the embodiment illustrated in FIG. 11.

The first projection 346 includes a height H that generally decreases toward its front 364. In addition, the first projection 346 includes many of the properties and functions as those described above with respect to the first projection 146 of the unidirectional valve 100; however, the first projection 346 of the unidirectional valve 300 has a maximum height that occurs at the rear 366 of the first projection 346, similar to the first projection 246 of the unidirectional valve of FIG. 10. As a result, the first projection 346 increases (e.g., parabolically or semi-parabolically) in height H from its front 364 to its rear 366 along its length L, and the maximum projected occurs at its rear 366. As shown in FIG. 11, when a flap 322 of the unidirectional valve 300 is in its open position $P_2''$, the profile of the first projection 346 is still configured to substantially follow the profile of the flap 322 when it is in its open position $P_2''$. Unlike the first projection 246 of the unidirectional valve 200 of FIG. 10, however, the first projection 346 of the unidirectional valve 300 of FIG. 11 has a generally parabolically-shaped cross-sectional shape, such that the bottom surface of the first projection 346 is arcuate and curves from its front 364 to its rear 366.

In addition, although not explicitly shown in the cross-sectional view shown in FIG. 11, it should be understood that, in some embodiments, the unidirectional valve 300 can include a second transverse projection, similar to the second projection 148 of the unidirectional valve 100, to press and/or hold a rear (i.e., fixed) portion 329 of the flap 322 into place, for example, on a flap-retaining surface 325. In such embodiments, the rear 366 of the first projection 346 can include or be coupled to (or provided by) the second transverse projection.

The rest of the properties described above with respect to the first projection 146, such as height at the front 364 of the first projection 346; ratio of the height H at the front 364 of the first projection 346 to the maximum height of the first projection 346; ratio of the height H at the front 364 of the first projection 346 to a projected height $H_p$ of the unidirectional valve 300; the first projection 346 generally decreasing in height H toward the front 364 of the first projection 346, etc. are generally the same as those described above with respect to the first projection 146 of the unidirectional valve 100 of FIGS. 1-9.

The following working examples are intended to be illustrative of the present disclosure and not limiting.

EXAMPLES

Flow Fixture

Pressure drop testing was conducted on the valve with the aid of a flow fixture. The flow fixture provided air, at specified flow rates, to the valve through an aluminum mounting plate and an affixed air plenum. The mounting plate received and securely held a valve seat during testing. The aluminum mounting plate had a slight recess on its top surface that received the base of valve. Centered in the recess was a 28 millimeter (mm) by 34 mm opening through which air could flow to the valve. Adhesive-faced foam material was available to be attached to the ledge within the recess to provide an airtight seal between the valve and the plate. Two clamps were used to capture and secure the leading and rear edge of the valve seat to the aluminum mount. Air was provided to the mounting plate through a hemispherical-shaped plenum. The mounting plate was affixed to the plenum at the top or apex of the hemisphere to mimic the cavity shape and volume of a respiratory mask. The hemispherical-shaped plenum was approximately 30 mm deep and had a base diameter of 80 mm. Air from a supply line was attached to the base of the plenum and was regulated to provide the desired flow through the flow fixture to the valve. For an established air flow, air pressure within the plenum was measured to determine the pressure drop over the test valve.

Pressure Drop Test

Pressure drop measurements were made on a test valve using the Flow Fixture as described above. Pressure drop across a valve was measured at flow rates of 15, 20, 30, 40, 50, 60, 70, and 85 liters per minute (L/min; also represented herein as $dm^3$/min). To test a valve, a test specimen was mounted in the Flow Fixture so that the valve seat was horizontally oriented at its base, with the valve opening facing up.

Care was taken during the valve mounting to assure that there was no air bypass between the fixture and the valve body. To calibrate the pressure gauge for a given flow rate, the flap was first removed from the valve body and the desired airflow was established. The pressure gauge was then set to zero, bringing the system to calibration. After this calibration step, the flap was repositioned on the valve body and air, at the specified flow rate, was delivered to the inlet of the valve, and the pressure at the inlet was recorded. The valve-opening pressure drop (just before a zero-flow, flap opening onset point) was determined by measuring the pressure at the point where the flap just opens and a minimal flow is detected. Pressure drop was the difference between the inlet pressure to the valve and the ambient air.

Leak Rate Test

For each test valve, five valves were tested for Leak Rate (LR) according to NIOSH Procedure No. RCT-APR-STP-0004, Revision 1.1, dated Jun. 3, 2005: DETERMINATION OF EXHALATION VALVE LEAKAGE TEST, AIR-PURIFYING RESPIRATORS STANDARD TESTING PROCEDURE. An average LR for each test valve was then calculated. The LR results were reported in cubic centimeters (cc)/min and converted to cc/sec.

Projected Height

A projected height for a given valve was determined by measuring, with a calipers, the highest point of the valve top from the base configured to attach to a respirator.

Projected Area

A projected area for a given valve was determined by measuring, with calipers, the edges of the area covered by the valve base perimeter, and calculating the area (i.e., the total area the valve would take up on a respirator).

Projected Volume

A projected volume for a given valve was determined by multiplying the projected height by the projected area for that given valve.

$$V=H*A,$$

where V=projected volume; H=projected height; and A=projected area.

Valve Actuation Power

For a given valve port area (the area of the channel delivering air directly to the valve flap (in Example 1, 3.14 $cm^2$), the "actuation power" for a valve at a given flow rate can be determined for a range of flow rates by integrating the curve representing the flow rate (abscissa) in L/min and pressure drop (ordinate) in Pa, over a flow rate range of 10 to 85 L/min. Integration of the curve, represented graphically as the area under the curve, gives the power required to actuate a valve over a range of flows. The value for the integrated curve was defined as the Integrated Valve Activation Power (IVAP) in watt (W) or milliwatt (mW) units.

Volume-Power-Leak Rate Product

The Projected Volume (V)-Power (IVAP)-Leak Rate (LR) product (the "V-IVAP-LR Product") for each valve tested was calculated by taking the product of the projected volume (V), the integrated valve actuation power (IVAP), and the leak rate (LR) at a given flow rate for a given valve.

$$V\text{-IVAP-LR Product}=V*\text{IVAP}*\text{LR}$$

Example 1 and Comparative Examples A-C

Example 1 and Comparative Examples A-C were tested according to the test procedures described above. Example 1 represents an example of a valve of the present disclosure, as shown in FIGS. 1-9, and comparative examples A-C represent exemplary commercially available valves, as detailed in Table 1 below. The commercially available valves were cut from commercially available respirator masks, the product name/number for which is listed in Table 1.

A projected height (H), projected area (A), projected volume (V), integrated valve actuation power (IVAP), leak rate (LR) and V-IVAP-LR product were determined for each of Example 1 and Comparative Examples A-C, the results of which are detailed below. Particularly, the Leak Rate (LR) results are shown in Table 2. The results for Projected Height (H), Projected Area (A), and Projected Volume (V) are shown in Table 3. The results for Pressure Drop are shown in Table 4. The results for Integrated Valve Actuation Power (IVAP) are shown in Table 5. The results for Volume-Power-Leak Rate (V*IVAP*LR) Product up to a flow rate of 85 L/min are shown in Table 6. The results for Volume-Power-Leak Rate (V*IVAP*LR) Product up to a flow rate of 40 L/min are shown in Table 7.

TABLE 1

Test Valves and Supplier Information

| Example No. | Supplier Name (Brand Name, if applicable) | Respirator | Supplier Location |
|---|---|---|---|
| Comp. Ex A | Moldex-Metric, Inc. | EZ 23 Med/Large | Culver City, CA |
| Comp. Ex B | Draeger Safety AG & Co. | X-PLORE ™ 1750 | Pittsburgh, PA |
| Comp. Ex C | 3M Company | 8511 | St. Paul, MN |

TABLE 2

Leak Rate (LR) Results (measured in cc/min at 1" of $H_2O$; converted to cc/sec)

| Ex. | LR (cc/min.) Valve 1 | LR (cc/min.) Valve 2 | LR (cc/min.) Valve 3 | LR (cc/min.) Valve 4 | LR (cc/min.) Valve 5 | LR (cc/min.) Average | LR (cc/sec) Average |
|---|---|---|---|---|---|---|---|
| 1 | 5 | 5 | 6 | 5 | 6 | 5.4 | 0.090 |
| A | 55* | 55 | 55 | 55 | 55 | 55 | 0.917 |
| B | 19 | 9 | 25 | 19 | 5 | 15.4 | 0.257 |
| C | 10 | 11 | 5 | 4 | 5 | 7.0† | 0.117 |

*55 cc/min. was the highest value the rotometer could read, actual reading is beyond 55 cc/min.

†50 new valves (i.e., not cut from a respirator) of the same type as Comparative Example C were additionally tested for Leak Rate. The average LR of the sample size of 50 was 6 cc/min (0.1 cc/sec), and the standard deviation was 2 cc/min (0.03 cc/sec).

TABLE 3

| Projected Height (H), Projected Area (A), and Projected Volume (V) | | | | |
|---|---|---|---|---|
| Ex. | A ($cm^2$) | Notes - Area measurement | H (cm) | V ($cm^3$) = A * H |
| 1 | 15.35 | 3.65 cm × 4.25 cm | 1.25 | 19.1 |
| A | 13.36 | n/a | 1.60 | 21.4 |
| B | 11.42 | Irregular shape, estimated area** | 1.45 | 16.6 |
| C | 15.35 | 3.65 cm × 4.25 cm | 1.61 | 24.7 |

**Estimated the area by weighing a piece of paper of known area; tracing the valve of Comparative Example B and cutting out a piece of paper having the valve shape; weighing the irregularly-shaped piece of paper; and calculating the estimated area.

TABLE 4

| Pressure Drop (measured in mm $H_2O$) at Various Flow Rates (L/min; $dm^3$/min.) | | | | | | | | |
|---|---|---|---|---|---|---|---|---|
| Ex. | 15 L/min | 20 L/min. | 30 L/min. | 40 L/min. | 50 L/min. | 60 L/min. | 70 L/min. | 85 L/min. |
| 1 | 3.2 | 3.6 | 3.9 | 5.2 | 7.0 | 8.3 | 10.1 | 12.2 |
| A | 5.7 | 7.0 | 8.2 | 9.3 | 10.6 | 12.0 | 14.0 | 16.5 |
| B | 2.1 | 2.5 | 3.0 | 3.5 | 4.2 | 4.9 | 6.3 | 8.5 |
| C | 3.1 | 3.5 | 3.9 | 5.1 | 6.8 | 8.2 | 9.9 | 12.3 |

TABLE 5

| Integrated Valve Actuation Power (IVAP); measured in mm $H_2O$*L/min; converted to milliWatts, mW (shown underneath the value reported in mm $H_2O$*L/min) | | | | | | |
|---|---|---|---|---|---|---|
| Ex. | Power Up to 85 L/min. | Power Up to 70 L/min. | Power Up to 60 L/min. | Power Up to 50 L/min. | Power Up to 40 L/min. | Power Up to 30 L/min. |
| 1 | 497 | 330 | 238 | 161 | 100 | 55 |
| | 78 | 52 | 37 | 25 | 16 | 9 |
| A | 767 | 538 | 408 | 295 | 195 | 108 |
| | 120 | 84 | 64 | 46 | 31 | 17 |
| B | 323 | 212 | 156 | 110 | 72 | 39 |
| | 51 | 33 | 24 | 17 | 11 | 6 |
| C | 490 | 324 | 233 | 158 | 98.5 | 54 |
| | 77 | 51 | 37 | 25 | 16 | 8 |

TABLE 6

| Volume-Power-Leak Rate Product up to 85 L/min (V*IVAP*LR Product in mW*$cc^2$/sec; measured in mm $H_2O$* $cc^2$*L/$min^2$; converted to milliwatt (mW)*$(cc)^2$/sec or mW*$cm^6$/sec) | | | | |
|---|---|---|---|---|
| Ex. | LR (cc/sec) | IVAP (mW, up to 85 L/min) | Volume (cc) | Product (mW*$cc^2$/sec) |
| 1 | 0.090 | 78 | 19.1 | 130 |
| A | 0.917 | 120 | 21.4 | 2360 |
| B | 0.257 | 51 | 16.6 | 220 |
| C | 0.117 | 77 | 24.7 | 220 |

TABLE 7

| Volume-Power-Leak Rate Product up to 40 L/min (V*IVAP*LR Product in mW*$cc^2$/sec; measured in mm $H_2O$* $cc^2$*L/$min^2$; converted to milliwatt (mW)*$(cc)^2$/sec or mW*$cm^6$/sec) | | | | |
|---|---|---|---|---|
| Ex. | LR (cc/sec) | IVAP (mW, up to 40 L/min) | Volume (cc) | Product (mW*$cc^2$/sec) |
| 1 | 0.090 | 16 | 19.1 | 30 |
| A | 0.917 | 31 | 21.4 | 600 |
| B | 0.257 | 11 | 16.6 | 50 |
| C | 0.117 | 16 | 24.7 | 40 |

The embodiments described above and illustrated in the figures are presented by way of example only and are not intended as a limitation upon the concepts and principles of the present disclosure. As such, it will be appreciated by one having ordinary skill in the art that various changes in the elements and their configuration and arrangement are possible without departing from the spirit and scope of the present disclosure. Various features and aspects of the present disclosure are set forth in the following claims.

What is claimed is:

1. A unidirectional valve for use with a filtering face mask, the unidirectional valve positioned to provide fluid communication between a first gas space and a second gas space, the unidirectional valve comprising:

a valve seat comprising a seal surface and an aperture positioned to provide fluid communication between the first gas space and the second gas space; and a flap, the flap being flexible and coupled to the valve seat such that the flap makes contact with the seal surface when the flap is in a closed position and such that the flap can flex away from the seal surface to an open position, wherein the first gas space and the second gas space are not in fluid communication via the aperture when the flap is in the closed position, and wherein the first gas space and the second gas space are in fluid communication via the aperture when the flap is in the open position, the flap having a fixed end and a free end;

a housing positioned to at least partially cover the valve seat and the flap, wherein the housing has a front and a rear, the front of the housing being proximate the free end of the flap and the rear of the housing being proximate the fixed end of the flap; and a projection coupled to an inner surface of the housing and positioned to project inwardly from the inner surface, the projection having a height, the height generally decreasing toward the front of the housing.

2. A filtering face mask comprising:

a mask body having an interior gas space;

the unidirectional valve of claim 1 positioned in fluid communication with the interior gas space of the mask body and an exterior gas space.

3. The unidirectional valve of claim 1, wherein the flap is cantilevered with respect to the seal surface.

4. The unidirectional valve of claim 1, wherein the unidirectional valve has a projected height of no greater than about 1.5 cm.

5. The unidirectional valve of claim 1, wherein the unidirectional valve has a projected height of about 1.25 cm.

6. The unidirectional valve of claim 1, wherein the unidirectional valve has a projected area of no greater than about 16 $cm^2$.

7. The unidirectional valve of claim 1, wherein the unidirectional valve has a projected volume of no greater than about 25 $cm^3$.

8. The unidirectional valve of claim 1, wherein the unidirectional valve has a projected volume of about 19.1 $cm^3$.

9. The unidirectional valve of claim 1, wherein the unidirectional valve has an integrated valve actuation power of at least one of:

no greater than about 80 mW at a flow rate of no greater than 85 $dm^3$/min, and no greater than about 20 mW at a flow rate of no greater than 40 $dm^3$/min.

10. The unidirectional valve of claim 1, wherein the unidirectional valve has a leak rate of no greater than about 0.100 cubic centimeters per second (cc/sec).

11. The unidirectional valve of claim 1, wherein the unidirectional valve has a volume-power-leak rate product of at least one of:

no greater than about 130 mW*$cc^2$/sec at a flow rate of no greater than 85 $dm^3$/min; and no greater than about 30 mW*$cc^2$/sec at a flow rate of no greater than 40 $dm^3$/min.

12. The unidirectional valve of claim 1, wherein the free end of the flap is free to move away from the seal surface of the valve seat.

13. The unidirectional valve of claim 1, wherein the projection includes a front end positioned toward the front end of the housing, and wherein the height of the projection at the front end is no greater than about 2.5 mm.

14. The unidirectional valve of claim 1, wherein the distance between the flap and the seal surface when the flap is in the open position is at least about 0.35 cm.

15. The unidirectional valve of claim 1, wherein the ratio of the height at a front of the projection to a maximum height of the projection is no greater than about 0.4.

16. A unidirectional valve for use with a filtering face mask, the unidirectional valve positioned to provide fluid communication between a first gas space and a second gas space, the unidirectional valve comprising:

a valve seat comprising a seal surface and an aperture positioned to provide fluid communication between a first gas space and a second gas space, and a flap, the flap being flexible and coupled to the valve seat such that the flap makes contact with the seal surface when the flap is in a closed position and such that the flap can flex away from the seal surface to an open position, wherein the first gas space and the second gas space are not in fluid communication via the aperture when the flap is in the closed position, and wherein the first gas space and the second gas space are in fluid communication via the aperture when the flap is in the open position;

a housing positioned to at least partially cover the valve seat and flap; and a projection coupled to an inner surface of the housing and positioned to project inwardly from the inner surface, the projection having a distal surface, the distal surface having a profile that substantially follows the profile of the flap when the flap is in the open position.

17. The unidirectional valve of claim 16, wherein the flap includes a free end and a fixed end, and wherein the housing has a front and a rear, the front of the housing being proximate the free end of the flap and the rear of the housing being proximate the fixed end of the flap, wherein the projection includes a front end positioned toward the front end of the housing, and wherein the height of the projection at the front end is no greater than about 2.5 mm.

18. A unidirectional valve for use with a filtering face mask, the unidirectional valve positioned to provide fluid communication between a first gas space and a second gas space, the unidirectional valve comprising:

a valve seat comprising a seal surface and an aperture positioned to provide fluid communication between the first gas space and the second gas space; and a flap, the flap being flexible and coupled to the valve seat such that the flap makes contact with the seal surface when the flap is in a closed position and such that the flap can flex away from the seal surface to an open position, wherein the first gas space and the second gas space are not in fluid communication via the aperture when the flap is in the closed position, and wherein the first gas space and the second gas space are in fluid communication via the aperture when the flap is in the open position, the flap having a fixed end and a free end;

a housing positioned to at least partially cover the valve seat and flap;

wherein the unidirectional valve has a volume-power-leak rate product of at least one of:

no greater than about 150 mW*$cc^2$/sec at a flow rate of no greater than 85 $dm^3$/min, and no greater than about 35 mW*$cc^2$/sec at a flow rate of no greater than 40 $dm^3$/min.

19. A unidirectional valve for use with a filtering face mask, the unidirectional valve positioned to provide fluid communication between a first gas space and a second gas space, the unidirectional valve comprising:

a valve seat comprising a seal surface and an aperture positioned to provide fluid communication between the first gas space and the second gas space; and a flap, the flap being flexible and coupled to the valve seat such that the flap makes contact with the seal surface when the flap is in a closed position and such that the flap can flex away from the seal surface to an open position, wherein the first gas space and the second gas space are not in fluid communication via the aperture when the flap is in the closed position, and wherein the first gas space and the second gas space are in fluid communication via the aperture when the flap is in the open position, the flap having a fixed end and a free end; and a housing positioned to at least partially cover the valve seat and the flap, the height of the housing being no greater than about 1.25 cm;

wherein the distance between the flap and the seal surface at the free end of the flap when the flap is in the open position is at least 0.35 cm.

20. The unidirectional valve of claim 19, further comprising a projection coupled to an inner surface of the housing and positioned to project inwardly from the inner surface, the projection having a height, the height generally decreasing toward the front of the housing.

21. The unidirectional valve of claim 19, further comprising a projection coupled to an inner surface of the housing and positioned to project inwardly from the inner surface, the projection having a distal surface, the distal surface having a profile that substantially follows the profile of the flap when the flap is in the open position.

* * * * *

UNITED STATES PATENT AND TRADEMARK OFFICE

CERTIFICATE OF CORRECTION

PATENT NO. : 8,365,771 B2
APPLICATION NO. : 12/639356
DATED : February 5, 2013
INVENTOR(S) : Thomas J Xue It is certified that error appears in the above-identified patent and that said Letters Patent is hereby corrected as shown below:

In the Specifications:

Column 10
Line 25, Delete "vise" and insert -- vice --, therefor.

Column 14
Line 6, Delete "to the to the" and insert -- to the --, therefor.

Column 17
Line 35, Delete "H t" and insert -- H at --, therefor.

Column 20
Line 9, (table 2), Delete "rotometer" and insert -- rotameter --, therefor.

Signed and Sealed this
Seventh Day of May, 2013

Teresa Stanek Rea
*Acting Director of the United States Patent and Trademark Office*